Figure 1:
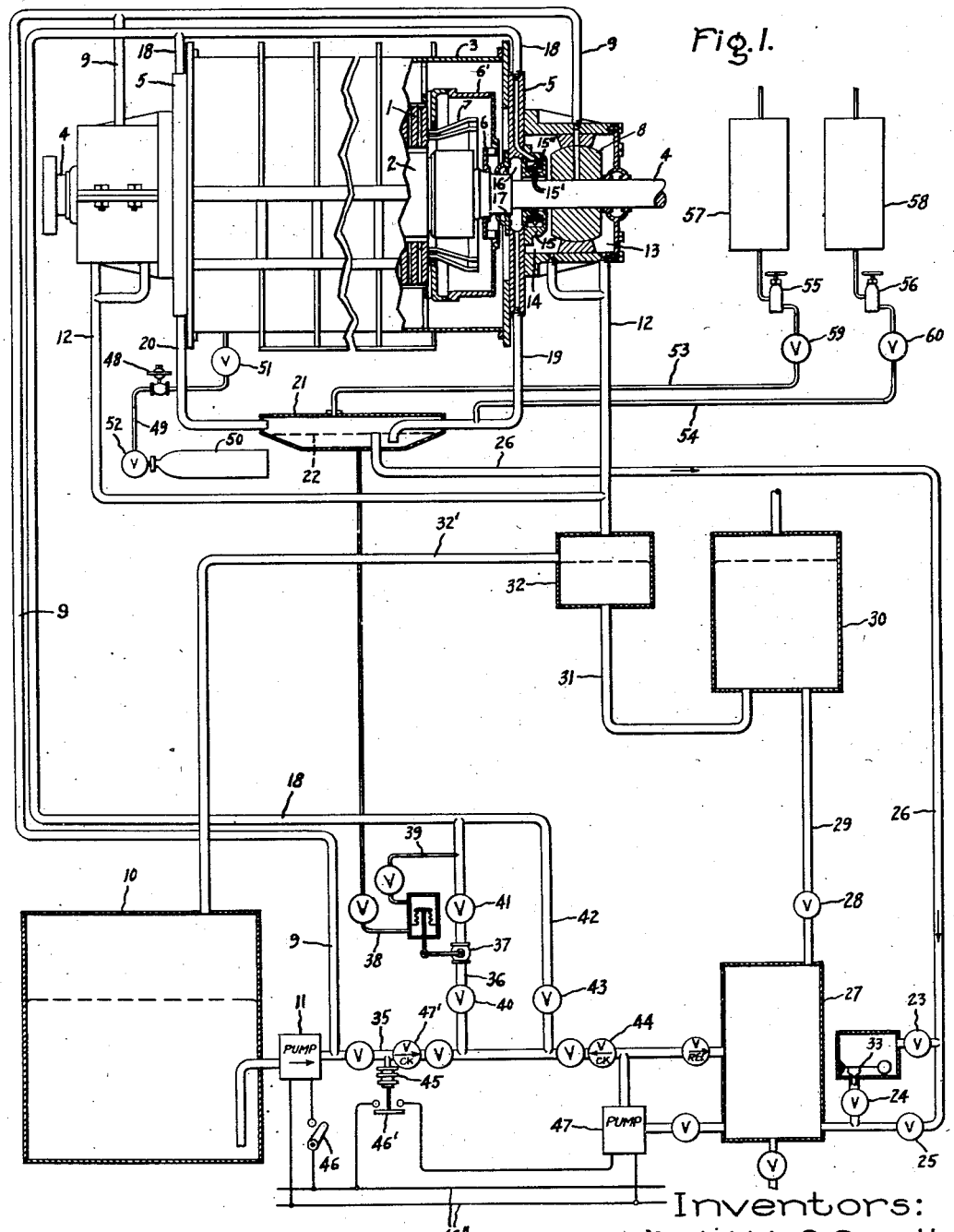

Inventors:
DeWitt S. Snell,
Lloyd P. Grobel,
by Their Attorney.

Nov. 30, 1948.  DE WITT S. SNELL ET AL  2,454,979
GAS FILLED MACHINE

Filed Jan. 17, 1947  3 Sheets-Sheet 2

Inventors:
De Witt S. Snell,
Lloyd P. Grobel,
by *Browell S. Mack*
Their Attorney.

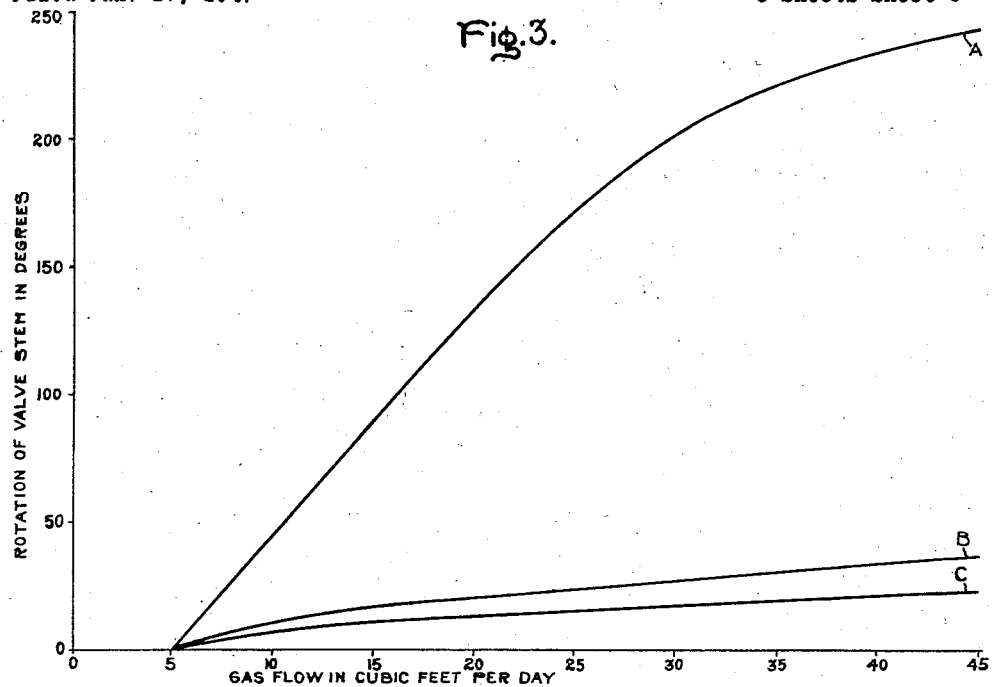
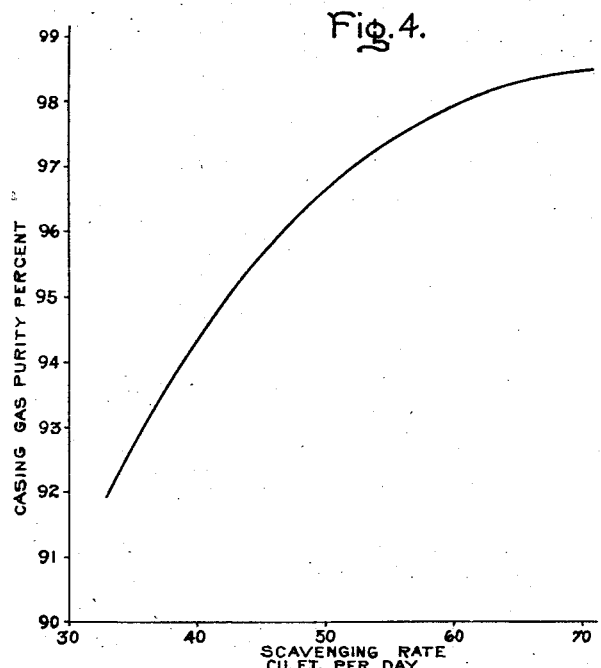

Patented Nov. 30, 1948

2,454,979

UNITED STATES PATENT OFFICE 2,454,979

GAS FILLED MACHINE

De Witt S. Snell and Lloyd P. Grobel, Schenectady, N. Y., assignors to General Electric Company, a corporation of New York Application January 17, 1947, Serial No. 722,542

5 Claims. (Cl. 171—252)

Our invention relates to gas-filled machines, such as hydrogen-cooled dynamoelectric machines.

In dynamoelectric machines with a gas-filled casing, the gas being used as a cooling medium, it is desirable to maintain the purity of the gas substantially constant and at a high level. Any failure to do so adversely affects the cooling properties of the gas and concurrently enhances the windage loss which it causes in the machine. One important factor in this connection is, of course, the provision of suitable means to prevent excessive loss of gas from the machine casing, and for this purpose it is common practice to provide liquid seals between the casing and shafts to prevent outward leakage of gas. It is also a frequent practice to deliver a continuous supply of liquid, typically lubricating oil, under pressure to such seals to maintain their effectiveness. Since the liquid so introduced may constitute an effective source of contaminants, particularly air, it is necessary to provide extensive purifying equipment, including gas detraining tanks and vacuum pumps, as a means of purifying the sealing liquid as it circulates and recirculates. This technique, while effective, is expensive in terms of the apparatus and operating power which it requires.

An object of our invention is to provide means for maintaining substantially constant the purity of the cooling gas in a gas-filled dynamoelectric machine without the use of elaborate and costly purging and purifying apparatus.

Another object of our invention is to reduce the entry of liquid vapors into the casing.

A further object of our invention is to make possible the use of untreated sealing liquid in the shaft seals without affecting the purity of the gas in the casing.

Still a further object of our invention is to eliminate the necessity of detraining air contained in or absorbed by the sealing liquid during storage or in the course of its circulation.

We have found it possible to attain these objects by a system which involves continuous scavenging of air introduced into the casing structure by the sealing liquid or otherwise. This is accomplished by maintaining a continuous but accurately controlled flow of cooling gas from the machine, with continuous replacement of the withdrawn gas such that the purity of the gas within the casing is maintained at constant level. An important feature of the invention consists in the provision of means by which the rate of gas withdrawal can be narrowly controlled within optimum limits. With the attainment of these conditions, we find it economically feasible to eliminate entirely from the system the elaborate sealing liquid purifying means heretofore employed. At the same time, we are enabled to maintain the gas within the casing at a higher level of constant purity than has previously been deemed practicable when the seals are supplied with untreated oil.

Figure 2:
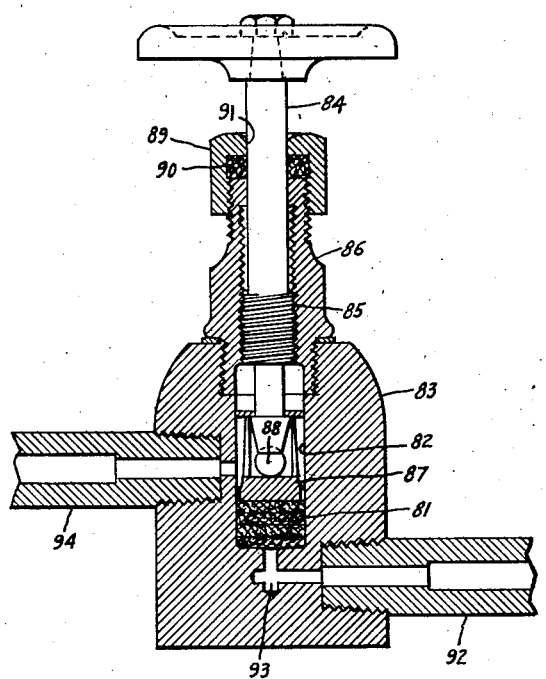

The features of the invention which are considered novel are pointed out with particularity in the appended claims. The invention itself, together with further objects and advantages thereof, may best be understood by reference to the following description taken in connection with the accompanying drawings in which Fig. 1 is a schematic representation showing in partial section a dynamoelectric machine suitable for the application of the invention, together with the system elements of which the invention is comprised; Fig. 2 shows in section the details of a form of valve used as one element of our improved system; Fig. 3 is a graphical representation useful in explaining the characteristics of the valve of Fig. 2; and Fig. 4 is a further graphical representation useful in explaining the advantages of our invention.

Referring to the drawing, in Fig. 1, we have shown a dynamoelectric machine including a stationary member 1 and a rotatable member 2 arranged within an enclosing casing 3 filled with a ventilating gas other than air, preferably such as hydrogen. The rotatable member 2 includes a shaft 4 which extends through the end walls 5 of the enclosing casing 3. In order to ventilate and cool the dynamoelectric machine effectively, a ventilating gas within the enclosing casing 3 is circulated therein through the various windings and parts of the machine and through gas coolers. This ventilating gas is drawn from the end of the enclosing casing 3 into the space enclosed by the end walls 5 and is recirculated by the ventilating fan 6 carried by the shaft member 4 and discharged into the fan casing 6′ which diverts the ventilating gas into the gap between the stationary member and the rotatable member and around the end turns of the stationary armature winding 7. Under various operating conditions of the dynamoelectric machine, it is desirable to maintain different ventilating gas pressures within the enclosing casing 3, requiring a sealing arrangement around the shaft openings in the enclosing casing for these different operating pressure conditions. The rotatatable shaft member 4 is supported by bearings 8 which are mounted in bearing housings carried by the end walls 5, and lubricating oil is supplied to the bearings 8 through a suitable bearing lubricating oil feed supply system. This includes a bearing oil feed line 9 which supplies oil to the bearings 8 through suitable bearing oil lubricating openings from a bearing oil reservoir tank 10, from which the oil is pumped by a suitable pump 11. Excess lubricating oil is drained from the bearings 8 into bearing oil drains 12 which connect with collecting chambers 13 and 14 formed in the bearing housings supported by the end walls 5 and lead to the bearing oil reservoir tank 10.

In order to prevent the mixing of atmospheric air and the ventilating gas within the casing, liquid seals 15 are provided at each end of the casing and are connected to the end walls 5. These liquid seals 15 may be of any type known in the art which limits the amount of sealing liquid flow along the shaft to the minimum amount necessary for preventing the escape of gas from the annular chambers 16 and for preventing the entrance of atmospheric air into the annular chambers 16. As illustrated, they comprise two diametrically split annular rings 15' which are held in sealing engagement with the shaft member 4 by annular springs 15''. Means (not shown) are provided for holding the rings against rotation. The annular chambers 16 are formed by deflectors 17 which sealingly engage the shaft 4, the liquid seals 15, and the end walls 5. Sealing liquid is adapted to be supplied to the seal 15 under a predetermined pressure through a sealing liquid supply including piping 18. Sealing liquid which passes through the seal to the bearing side of the seal is collected in collection chambers 14, and this excess liquid is removed from the collection chamber through bearing oil drain piping 12. Sealing liquid which passes through the seals to the gas side of the seals is collected in the annular chamber 16 and in the corresponding chamber assumed to exist at the other end of the machine, and this excess sealing liquid is removed from these chambers through suitable drain piping 19 and 20. An enlarged connection or header 21 in the sealing liquid drain provides a relatively large liquid surface 22 for permitting the escape of gas from the sealing liquid. A pipe 26 is disposed in header 21 in such a manner that it maintains the liquid surface 22. The sealing liquid flows from the header 21 through pipe 26 to a valve system including a float valve 33 and a by-pass valve 25. This valve system serves the purpose of preventing gas flow from the sealing liquid drain enlargement or header 21 to the sealing liquid storage tank 27. During normal low pressure operation, the valves 23 and 24 are closed, and by-pass valve 25 is open, thus permitting the excess sealing liquid to flow from header 21 through pipe 26 to the sealing liquid storage tank 27, thence through the normally open valve 28 and pipe 29 to the atmospheric tank 30. From here, it passes through pipe 31 to tank 32, and when the sealing liquid level in tank 32 is even with pipe 32', the sealing liquid flows by gravity through pipe 32' to reservoir tank 10. The U-tube formed by pipe 26, tank 27, pipe 29, tank 30, pipe 31, and tank 32 prevents during low pressure operation the flow of the gas from enlargement 21 to the sealing liquid storage tank 27. When the effective length of the U-tube thus formed it not great enough to equal the pressure in enlargement 21, valves 23 and 24 are opened and valve 25 is closed, thus placing into operation float valve 33 which closes when liquid is forced entirely out of the pipe 26 and thus prevents the passage of gas into the sealing liquid storage tank 27.

When the dynamoelectric machine is in operation, bearing oil, which in the preferred case is used also as sealing liquid, is pumped from reservoir tank 10 by the main lubricating oil circulating pump 11. Part of the oil coming from pump 11 is conducted by piping 9 to the bearings 8 and part is conducted by piping 35, 36 and 18 to liquid seals 15. The pressure at which the sealing liquid is supplied to liquid seals 15 is maintained at a predetermined amount greater than the pressure in enclosing casing 3 and in chamber 16 by a differential pressure control valve 37 which is interposed in piping 36. The operating mechanism of the differential pressure control valve 37 is connected to the sealing liquid drain enlargement 21 by the piping 38 and to the sealing liquid supply piping 36 by piping 39. The valves 40 and 41 interposed in piping 36 are provided so that the differential pressure control valve 37 may be isolated should repairs be necessary. If control valve 37 is isolated by closing valves 40 and 41, the sealing liquid supply is continued through piping 42 by manually operating valve 43. The reverse flow-preventing valve 44 is interposed in piping 35 to prevent the circulating pump 11 from recirculating sealing liquid between tanks 27 and 10.

When the dynamoelectric machine is not in operation, pump 11 is shut off as by opening switch 46 and the drop in pressure in piping 35 allows the bellows 45 to collapse and close the electrical contact 46'. This starts a separate sealing liquid pump 47 associated with the storage tank 27 by connecting the pump to a power supply source 46''. The pump 47 pumps the sealing liquid from tank 27 through piping 36 or 42 in the same manner as does pump 11. A reverse flow-preventing valve 47' interposed in piping 35 prevents the passage of sealing liquid through piping 35 to tank 10 when pump 47 is in operation.

An important aspect of our invention consists in the fact that by virtue of its use it is unnecessary at any point in the system to provide means for removing air entrained and dissolved in the lubricating and sealing oil employed. On the contrary, we find it possible to use untreated oil and to completely eliminate the cumbersome vacuum apparatus conventionally employed to get rid of absorbed air lest it seriously pollute the ventilating gas employed in the main casing. The means by which this is accomplished will be described in the following.

In order to maintain the purity of the gas in the enclosing casing 3 at a relatively high value, pure ventilating gas is admitted to the enclosing casing while the gas which is most susceptible to pollution by inward leakage of air is allowed to escape systematically from the enclosing casing according to an arrangement to be explained at a later point. The admission of the pure gas is accomplished by an arrangement including an adjustable pressure-regulating valve 48 interposed in connecting piping 49 which joins the enclosing casing 3 with a high pressure ventilating gas container 50. The adjustable pressure regulating valve 48 may be adjusted to maintain any desired pressure in the enclosing casing 3. Also, a valve 51 is interposed in piping 49 for isolating the adjustable pressure regulating valve 48 from the enclosing casing 3 when desired, and a valve 52 is provided for isolating the pressure regulating valve 48 from the high pressure ventilating gas container 50.

With the scavenging system in operation the overall pressure of the ventilating gas in the enclosing casing 3 causes an outward leakage between the deflectors 17 and the shaft 4 into the annular chambers 16. This outward leakage of ventilating gas through annular chambers 16 scavenges from the annular chambers 16 the air which is liberated by the untreated sealing liquid which flows from the liquid seal 15 into the annular chambers 16.

This outward leakage of ventilating gas also reduces the flow of sealing liquid vapors from the annular chambers 16 to the enclosing casing 3. The liquid vapors which are formed in annular chambers 16, as a result of sealing liquid being thrown off of the shaft member 4 or otherwise, tend to enter the enclosing casing 3 through the clearance provided between the deflector 17 and the shaft members 4; however, this flow is sufficiently opposed by the outward leakage of ventilating gas from the enclosing casing 3 so that the net entry of such vapors into the main casing is negligible. Moreover, the accumulation of such vapors in the chambers 16 is minimized by virtue of the continuous passage of gas from these chambers into the pipes 19 and 20.

The leakage gas, the liberated air, the sealing liquid vapors, and the sealing liquid flow through piping 19 and 20 to the header formed by the enlarged portion 21 of the sealing liquid drain. The enlarged portion 21 of the sealing liquid drain provides a large liquid surface 22 which permits the escape from the liquid of such excess of gas and air as is capable of being removed without vacuum treatment (which our invention avoids). The gas trap formed by piping 19 ending below the liquid surface 22 of the enlarged portion 21 of the sealing liquid drain keeps the leakage gas from each end of the dynamoelectric machine separate. The gas trapped in piping 19 is drained off by piping 54, and the gas coming from piping 20 entrapped in the enlarged portion 21 of the sealing liquid drain is drained off by piping 53. The flow of scavenging and scavenged gas through piping 53 and 54 is controlled by vernier throttling valves 55 and 56. Flowmeters 57 and 58 are interposed in piping 53 and 54 to measure and thus to facilitate control of the amount of scavenging and scavenged gas flowing from each end of the enclosing casing 3. The scavenging and scavenged gases after passage through the flowmeters 57 and 58 are discharged to the atmosphere. Also interposed in piping 53 and 54 are pressure reduction and cutoff valves 59 and 60 which are necessary for completely shutting off the flow of scavenging gas through the annular chamber 16.

To insure the safe operation of this scavenging system, purity indicators (not shown) may be inserted in piping 53 and 54 so that the purity of the scavenging and scavenged gas may be measured after the gas passes through the flowmeters 57 and 58. The purity of this gas must be maintained above the explosive limit of the gas, which is 75% hydrogen and 25% air when hydrogen is used.

When the shaft extends through only one end of the enclosing casing, it is not necessary to provide a gas trap as shown in Fig. 1 by drain piping 19 ending below the liquid surface 22 in the seal drain enlargement.

The success of our invention depends largely upon the fact that we provide means for controlling the flow of scavenging gas within a range which adequately maintains the purity of the ventilating gas at a high level while being sufficiently economical of pure gas to show a substantial saving over those systems which require elaborate apparatus for the constant purification of the sealing liquid. This is accomplished by accurately regulating the escape of mixed gas and air from the chamber 16 and its subsequent release to the atmosphere through flowmeters 57 and 58.

The degree of control postulated in the foregoing has been found possible by use of a regulating valve which requires a relatively great valve stem rotation for a small change in flow through the valve, and in Fig. 2 we have shown the details of a vernier throttling valve which has this characteristic. This valve is to be considered as an enlarged sectional view of the valves 55 and 56 of Fig. 1.

In Fig. 2 there are shown a number of pads of resilient fibrous material 81 located in the bore 82 of the valve body 83, the flow of gas through the valve being controlled by the porosity of this material. The pads 81 may consist of felt, wool yarn, or similar resilient fibrous materials. Porosity is controlled by compressing the fibrous material with a force exerted by rotation of a valve stem 84 which is in threaded engagement at 85 with a valve head 86 screwed into the upper portion of the valve body 83. To insure a uniform pressure on the resilient fibrous material 81, a pressure distributing member 87 is used. The force exerted by the valve stem 84 is applied to the pressure distributing member 87 through a spherical bearing 88. Leakage of gas from the valve bore 82 along the valve stem 84 is prevented by a seal 90 which may be made from any suitable packing material, such as graphite impregnated flax packing. The seal 90 is kept in sealing engagement with the valve stem 84 and the valve head 86 by the packing nut 89 which is in threaded engagement with the valve head 86. The bore 91 is provided in packing nut 89 for passage of valve stem 84.

A gas whose flow is to be controlled is admitted to the bore 82 of the valve body 83 through an inlet orifice 93 connected to piping 92, which may be assumed to correspond to the terminal portion of one of the pipes 53, 54 shown in Fig. 1. The gas then flows through the resilient fibrous material 81 into the upper portion of the bore 82 and is drained off by piping 94. In the application of the valve in the system of Fig. 1, the gas so passing through the valve would go to flowmeter 57 or 58 and thence to atmosphere. The sensitivity of this type of valve may be changed by changing the amount of resilient fibrous material 81 placed in the bore 82 of this valve.

Referring to Fig. 3, we have shown a graphical representation useful in explaining the characteristics of the valve in Fig. 2. For a better understanding of these characteristic curves, it may be assumed that each of the three valves whose characteristic curves are shown in Fig. 3 perform the function of one of the valves 55, 56 interposed in one of the pipes 53, 54 shown in Fig. 1, that gas was allowed to flow in one of the pipes 53, 54 under pressure of one-half pound per square inch, and that each valve was used for throttling the flow of gas. The characteristic curve A was obtained by using a valve of the type shown in Fig. 2, the characteristic curve B was obtained by using a standard needle valve with a 15° needle, and the characteristic curve C was obtained by using a standard needle valve with a 30° needle. By comparing the slope of these three characteristic curves, it can be seen that the valve of the type shown in Fig. 2 permits a relatively large valve stem rotation for a small change of gas flow through the valve as compared to the small valve stem rotation for an equivalent change in flow through the two standard needle valves. More specifically, it is possible with a valve of this type to adjust the rate of flow with an accuracy of plus or minus one cubic foot per day. This high degree of controllability of flow through the valves 53 and 54 makes it possible to accurately throttle the flow of mixed gas and air from chamber 16 of Fig. 1.

Referring to Fig. 4, we have shown a graphical representation of the percentage value of pure gas in the enclosing casing 3 of Fig. 1 as a function of the scavenging flow through the annular chambers 16.

From this curve, it will be seen that for the particular machine on which the tests were made a gas purity on the order of or above 98% can be maintained with a rate of scavenging gas flow materially less than 100 cubic feet per day. This result was obtained with a machine having a rating of 37500 kva. and a speed of rotation of 3600 revolutions per minute. While the rate of gas flow required will, of course, vary with the size of machine involved, even for a relatively small machine, this rate of gas loss is economically acceptable. In connection with larger machines, the cost of hydrogen supply becomes increasingly less significant in relation to the total investment in equipment so that the greater rate of gas flow which might be required with such machines will be well within the bounds of profitable operation.

While we have illustrated and described a particular embodiment of our invention, modifications thereof will occur to those skilled in the art. We desire it to be understood, therefore, that our invention is not to be limited to the particular arrangement disclosed, and we intend in the appended claims to cover all modifications which do not depart from the spirit and scope of our invention.

What we claim as new and desire to secure by Letters Patent of the United States is:

1. A machine having a gas-filled casing and a rotatable member with a shaft extending through said casing, means for supplying gas under pressure to said casing, a chamber formed by spaced members sealingly engaging the shaft at the region of its egress from said casing, said chamber being maintained by said sealing members at a pressure between that of the casing and the surrounding atmosphere whereby gas continuously enters the chamber from the casing by flow past the inner of said members, means supplying a flow of oil along the shaft at the outer of said members to prevent leakage of gas past said outer member, said oil being a carrier of air which tends to accumulate within said chamber, means for continuously conducting gas and air from the chamber, and means for controlling the rate of said conduction, said last-named means being controllably adjustable in a range which includes the minimum rate of flow adequate to keep the purity of gas within the casing at an effective cooling level.

2. A dynamoelectric machine of at least several thousand kva. capacity having a gas-filled casing and a rotatable member with a shaft extending through said casing, means for supplying gas under pressure to said casing, a chamber formed by spaced members sealingly engaging the shaft at the region of its egress from said casing, said chamber being maintained by said sealing members at a pressure between that of the casing and the surrounding atmosphere whereby gas continuously enters the chamber from the casing by flow past the inner of said members, means supplying a flow of oil along the shaft at the outer of said members to prevent leakage of gas past said outer member, said oil being a carrier of air which tends to accumulate within said chamber, means for continuously conducting gas and air from the chamber, and means for maintaining the rate of said conduction at a value on the order of 100 cubic feet per day whereby the purity of gas within the casing is maintained substantially constant at an effective cooling level.

3. A dynamoelectric machine of at least several thousand kva. capacity having a gas-filled casing and a rotatable member with a shaft extending through said casing, means for supplying gas under pressure to said casing, a chamber formed by spaced members sealingly engaging the shaft at the region of its egress from said casing, said chamber being maintained by said sealing members at a pressure between that of the casing and the surrounding atmosphere whereby gas continuously enters the chamber from the casing by flow past the inner of said members, means supplying a flow of oil along the shaft at the outer of said members to prevent leakage of gas past said outer member, said oil being a carrier of air which tends to accumulate within said chamber, means for continuously conducting gas and air from the chamber and exhausting the same to atmosphere, and means for maintaining the rate of said conduction at a value on the order of 100 cubic feet per day, said last named means being regulable with an accuracy of approximately plus or minus a few cubic feet per day whereby said conduction rate may be accurately adjusted to maintain the purity of gas within the casing at a predetermined level.

4. A dynamoelectric machine of at least several thousand kva. capacity having a gas-filled casing and a rotatable member with a shaft extending through said casing, means for supplying gas under pressure to said casing, a chamber formed by spaced members sealingly engaging the shaft at the region of its egress from said casing, said chamber being maintained by said sealing members at a pressure between that of the casing and the surrounding atmosphere whereby gas continuously enters the chamber from the casing by flow past the inner of said members, means supplying a flow of oil along the shaft at the outer of said members to prevent leakage of gas past said outer member, said oil being a carrier of air which tends to accumulate within said chamber, means for continuously conducting gas and air from the chamber and associating the same to atmosphere, and means for maintaining the rate of such conduction at a value within an economical operating range but sufficient to keep the purity of gas within the casing at a purity above 90%, said last-named means including a valve readily adjustable to control the rate of gas flow with an accuracy of plus or minus a few cubic feet per day, and a flow meter to facilitate adjustment of said valve.

5. A method of operating a machine of the type which includes an enclosing casing having at one end thereof a pair of spaced seals, which method comprises supplying gas under pressure to the machine casing while continuously withdrawing gas from the space between said seals and exhausting to atmosphere, the rate of gas withdrawal being set at a rate effective to maintain an essentially constant level of purity in the encased gas without exceeding the bounds of economy.

DE WITT S. SNELL.
LLOYD P. GROBEL.

REFERENCES CITED

The following references are of record in the file of this patent:

UNITED STATES PATENTS

| Number | Name | Date |
|---|---|---|
| 2,307,755 | Beckwith | Jan. 12, 1943 |